(12) United States Patent
Yasuda

(10) Patent No.: US 9,436,062 B2
(45) Date of Patent: Sep. 6, 2016

(54) CAMERA BODY

(71) Applicant: PANASONIC CORPORATION, Osaka (JP)

(72) Inventor: Koji Yasuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/501,979

(22) Filed: Sep. 30, 2014

(65) Prior Publication Data

US 2015/0104164 A1    Apr. 16, 2015

(30) Foreign Application Priority Data

Oct. 15, 2013  (JP) .................................. 2013-214492
Jul. 29, 2014  (JP) .................................. 2014-153511

(51) Int. Cl.
*G03B 9/28* (2006.01)
*G03B 9/08* (2006.01)
*G03B 17/14* (2006.01)
*G03B 11/04* (2006.01)

(52) U.S. Cl.
CPC ............... *G03B 9/08* (2013.01); *G03B 11/045* (2013.01); *G03B 17/14* (2013.01); *G03B 2217/002* (2013.01)

(58) Field of Classification Search
CPC ............ G03B 9/08; G03B 9/10; G03B 9/12; G03B 9/14; G03B 9/16; G03B 9/18; G03B 9/20; G03B 9/22; G03B 9/24; G03B 9/26; G03B 9/28; G03B 9/30; G03B 9/32; G03B 9/34; G03B 9/36; G03B 9/38; G03B 9/40; G03B 9/42; G03B 9/44; G03B 9/46; G03B 9/48; G03B 9/50; G03B 9/52; G03B 9/54
USPC ................ 396/479, 480, 488, 485, 483, 452
See application file for complete search history.

(56) References Cited

U.S. PATENT DOCUMENTS

| 7,042,502 | B1 * | 5/2006 | Ezawa ................... G03B 19/12 348/222.1 |
| 2008/0031615 | A1 * | 2/2008 | Wakabayashi ................ 396/452 |
| 2010/0183288 | A1 * | 7/2010 | Kudoh ............................ 396/55 |
| 2011/0164171 | A1 | 7/2011 | Yasuda et al. |
| 2012/0008043 | A1 | 1/2012 | Yasuda et al. |
| 2012/0299411 | A1 * | 11/2012 | Qiu ........................ H02K 3/522 310/71 |

FOREIGN PATENT DOCUMENTS

WO    2010-029731 A1    3/2010

* cited by examiner

*Primary Examiner* — Walter L Lindsay, Jr.
*Assistant Examiner* — Fang-Chi Chang
(74) *Attorney, Agent, or Firm* — McDermott Will & Emery LLP

(57) ABSTRACT

A camera body includes a flare cutter, a front case, and a control board. The flare cutter includes a first opening. The front case is disposed facing a first face of the flare cutter, and includes a second opening at a position facing the first opening. The control board is disposed on a second face of the flare cutter that is opposite the first face. When the flare cutter is viewed from outside of the front case, a part of the control board does not overlap with the flare cutter.

10 Claims, 13 Drawing Sheets

CAMERA BODY

RELATED APPLICATIONS

This application claims the benefit of Japanese Application No. 2014-153511, filed on Jul. 29, 2014 and Japanese Application No. 2013-214492, filed Oct. 15, 2013, the disclosures of which Applications are incorporated by reference herein.

BACKGROUND OF THE INVENTION

1. Field of the Invention

The present disclosure relates to camera bodies, and in particular, to a camera body including a mechanical shutter unit.

2. Background Art

International Publication No. 2010/029731 discloses a camera body including a shutter unit. The camera body disclosed in International Publication No. 2010/029731 is a so-called mirrorless camera without reflex mirror for directing incident light to a finder.

SUMMARY

A camera body includes a flare cutter, a front case, a shutter unit, and a control board. The flare cutter includes a first opening. The front case is disposed facing the first face of the flare cutter, and includes a second opening at a position facing the first opening. The control board is disposed on the second face of the flare cutter opposite the first face of the flare cutter. The shutter unit is disposed facing the second face of the flare cutter, and includes a third opening smaller than the first opening. When the camera body is viewed from an object side, the control board does not overlap with the shutter unit.

DETAILED DESCRIPTION OF THE PREFERRED EMBODIMENT

Single-lens reflex cameras need to allow different kinds of interchangeable lenses to be mounted on the camera bodies. Hence, even if camera bodies are different, the openings for mounting the interchangeable lenses need to have a predetermined shape.

A conventional camera body may include a flare cutter between a front unit and a shutter unit to prevent entry of unnecessary light.

Downsizing the flare cutter and the shutter unit in order to achieve a smaller camera body generates a gap between the opening of a front case through which an optical axis passes and the flare cutter. This may result in leakage of light.

The present disclosure provides a small camera body including a shutter unit.

An embodiment will be described in greater detail with reference to the accompanying drawings. However, unnecessarily detailed description may be omitted. For example, detailed description of already well known matters or description of substantially identical configurations may be omitted. This is intended to avoid redundancy in the description below, and to facilitate understanding of those skilled in the art.

Note that the attached drawings and the following description are provided so that those skilled in the art can fully understand the present disclosure. Therefore, the drawings and description are not intended to limit the subject matter defined by the claims.

[1. Structure]

[1-1. Schematic Structure of Camera Body]

Figure 3:
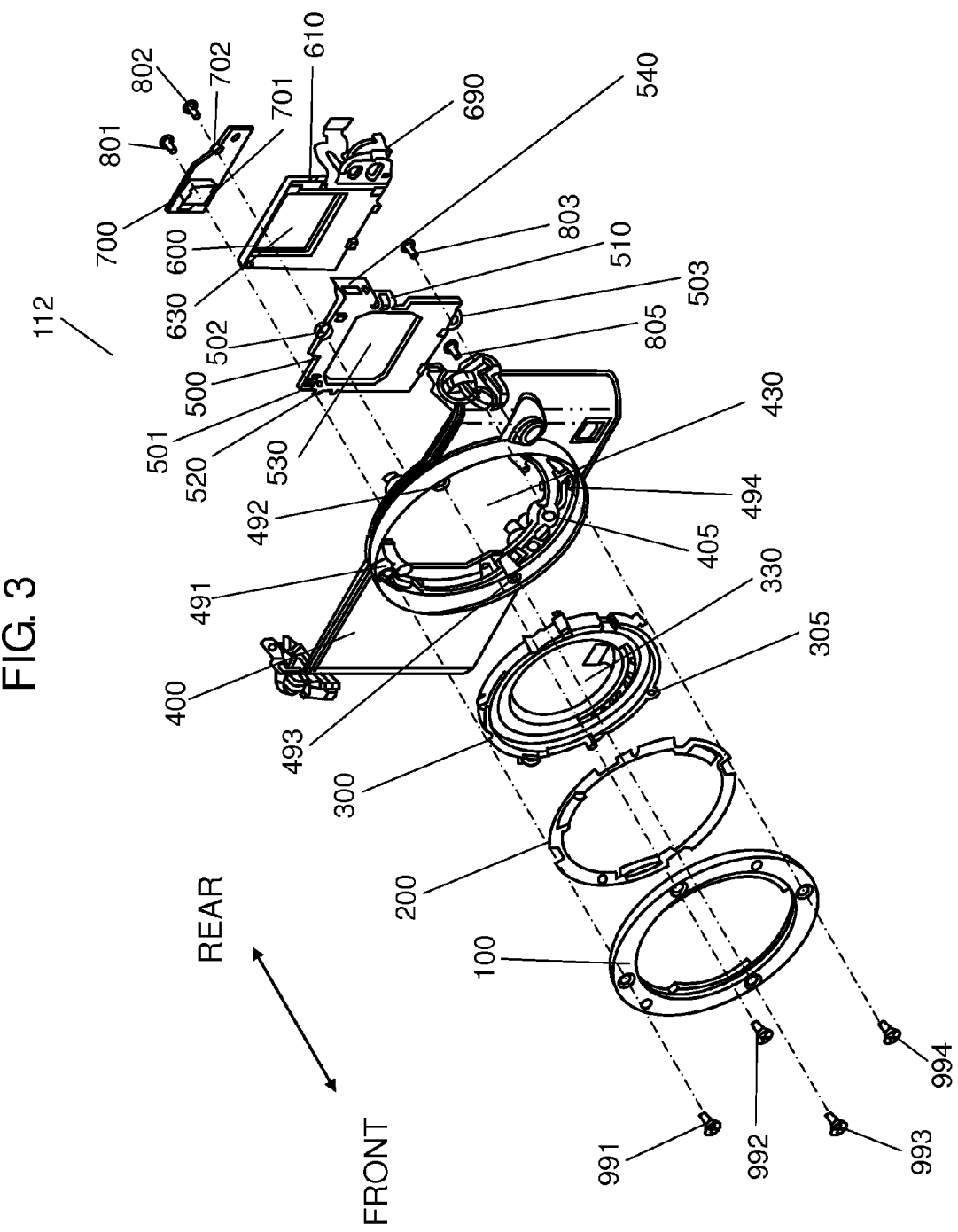
FIG. 3 is an exploded perspective view of the front unit of the camera body according to the embodiment.
Figure 4:
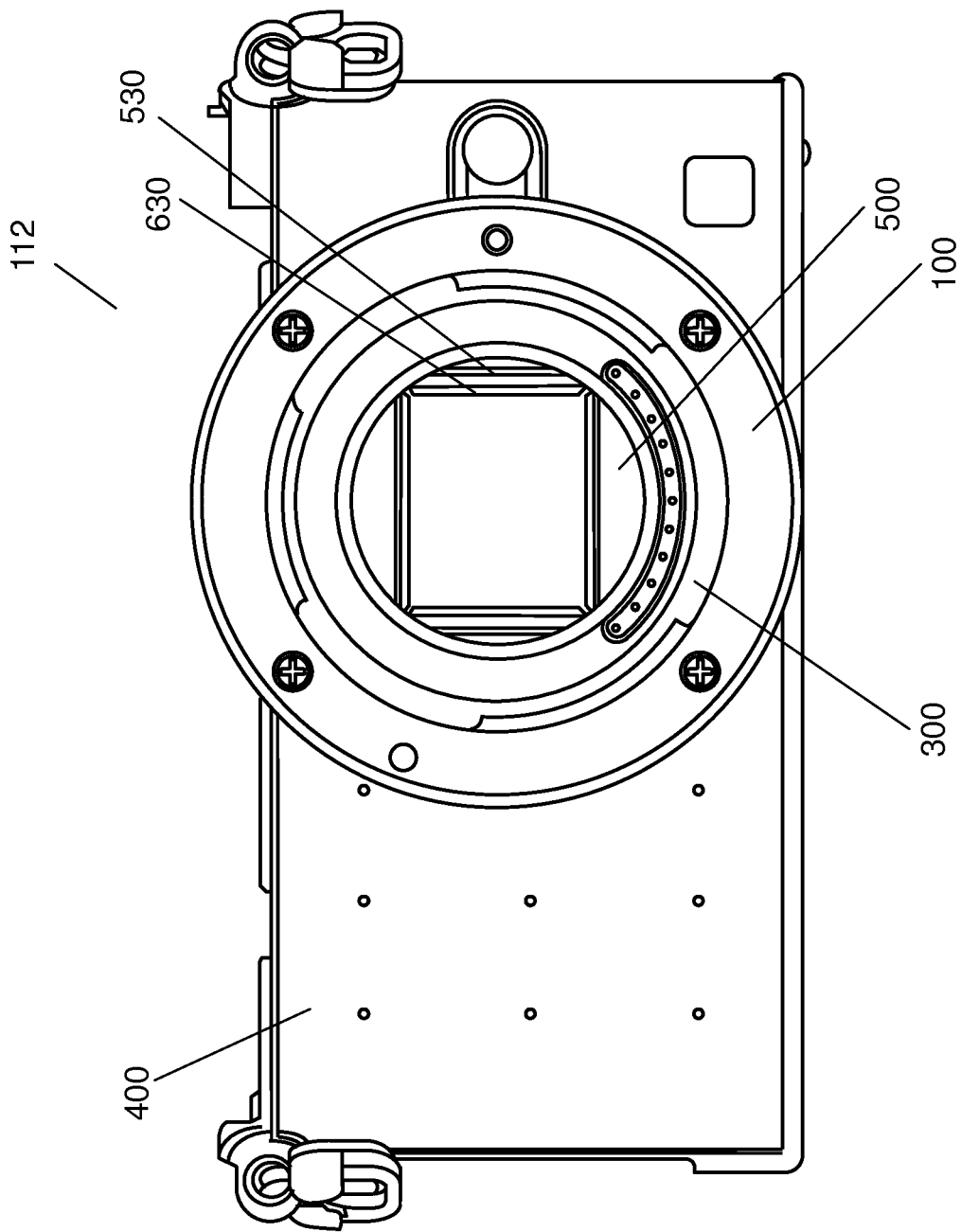
FIG. 4 is a front view of the front unit of the camera body according to the embodiment.

Referring to FIGS. 1 to 7, a description will be given of a structure of camera body 110 according to the present embodiment. As FIG. 3 illustrates, the orientation in which mount base 300 is mounted with respect to front case 400 is defined as the front. The orientation in which flare cutter 500 is mounted with respect to front case 400 is defined as the rear.

Figure 1:
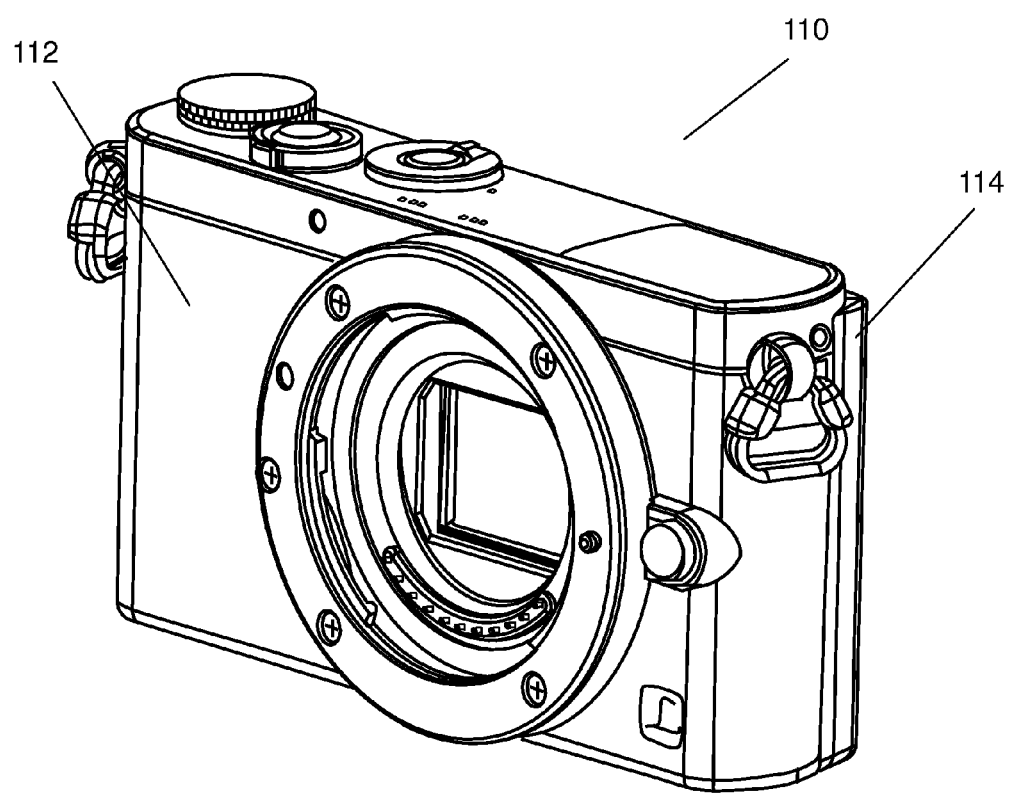
FIG. 1 is a perspective view of a camera body according to an embodiment.
Figure 2:
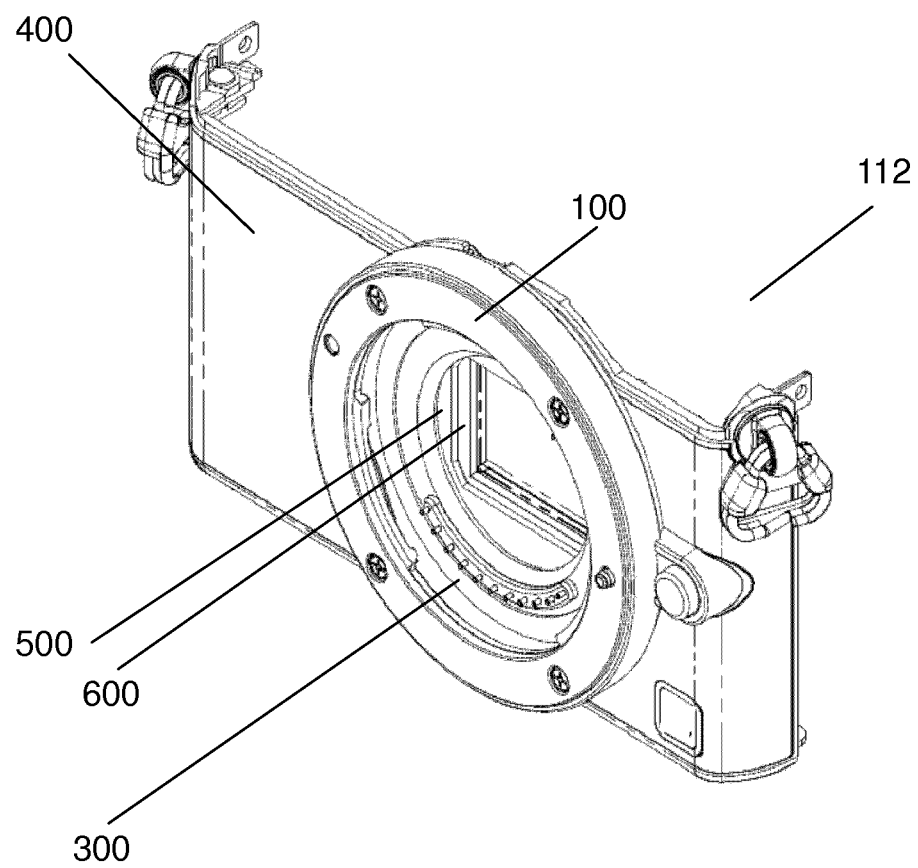
FIG. 2 is a perspective view of a front unit of the camera body according to the embodiment.

Hereinafter, a description will be given of a structure of camera body 110. As FIG. 1 illustrates, camera body 110 includes front unit 112 and back unit 114. As FIG. 3 illustrates, front unit 112 includes lens mount 100, bayonet spring 200, mount base 300, front case 400, flare cutter 500, shutter unit 600, and control board 700. Front unit 112 may further include an imaging device unit (not illustrated). It is preferable that the imaging device unit be directly attached to front case 400 by screws (not illustrated) or the like. By doing so, the imaging device unit is not fixed to front case 400 via shutter unit 600, allowing further downsizing of front unit 112.

[1-2. Front Structure of Front Case]

Next, a description will be given of front case 400 and components mounted on the front face of front case 400. Because a mirror box is not disposed at a front unit in a mirrorless single-lens reflex camera, the front unit needs to have certain strength for mounting an interchangeable lens. Accordingly, it is preferable that front case 400 is formed of a metal material such as magnesium.

Front case 400 has opening 430. Mount base 300, bayonet spring 200, and lens mount 100 are disposed on the front face of the front case 400. The front face of front case 400 includes screw holes 491, 492, 493, and 494, through-hole 405, and a protrusion (not illustrated) for positioning mount base 300.

Mount base 300 includes opening 330. Opening 330 of mount base 300 is smaller than opening 430 of front case 400. Mount base 300 includes screw hole 305 at the bottom portion. As FIG. 3 illustrates, screw 805 is screwed into screw hole 305 of mount base 300 through through-hole 405 from the rear face of front case 400. In other words, screw 805 is screwed into screw hole 305 of mount base 300 through through-hole 405 of the front case 400, so that mount base 300 and front case 400 are fixed to one another.

Screws 991, 992, 993, and 994 are screwed into screw holes 491, 492, 493, and 494 of front case 400 through lens mount 100, so that lens mount 100 is attached to front case 400.

[1-3. Rear Structure of Front Case]

Next, a description will be given of components mounted on the rear face of front case 400 of camera body 110. Flare cutter 500, shutter unit 600, and control board 700 are disposed on the rear face of front case 400. Additionally, an imaging device unit (not illustrated) may be disposed on the rear face of shutter unit 600 and control board 700.

Figure 7:
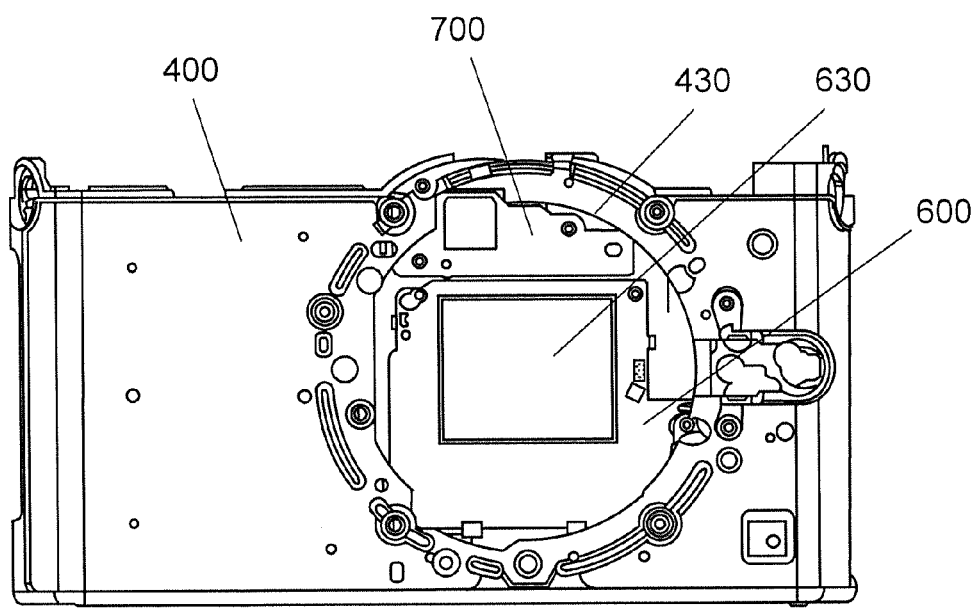
FIG. 7 is a front view of the front unit of the camera body according to the embodiment, with a lens mount and a mount base removed.

As FIG. 7 illustrates, when control board 700 is viewed from the front side (the flare cutter is not shown), a part of control board 700 positioned inside opening 430 (second opening) of front case 400 and outside opening 630 (third opening) of shutter unit 600. Such a structure allows downsizing of camera body 110.

[1-3-1. Structure of Flare Cutter]

Flare cutter 500 includes opening 530 (first opening) which satisfies an aperture area of light entering an imaging device. Opening 530 has an octagonal shape to satisfy the aperture area corresponding to the image circle. Opening 530 of flare cutter 500 is smaller than opening 430 (second opening) of front case 400. Hereinafter, a detailed description will be given of a structure of flare cutter 500.

Figure 8A:
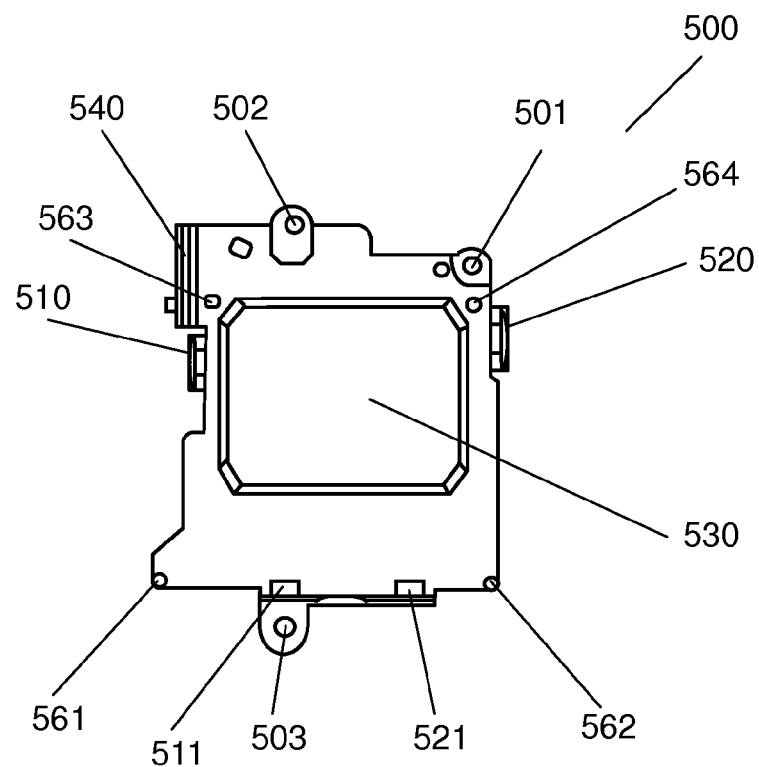
FIG. 8A is a rear view of a flare cutter of the camera body according to the embodiment.
Figure 8B:
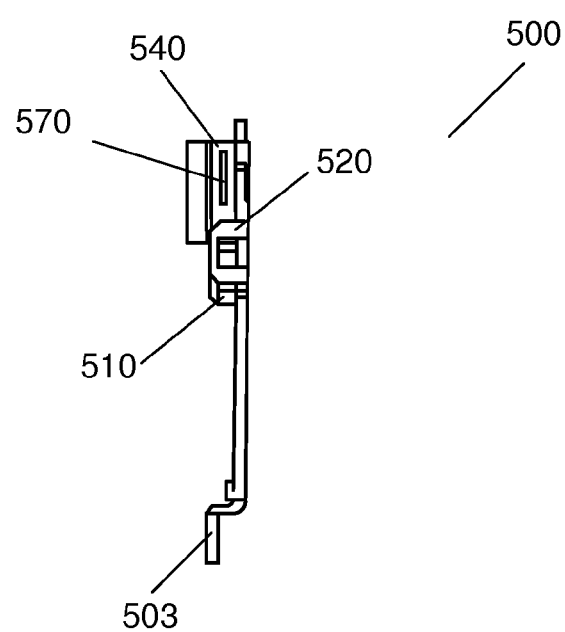
FIG. 8B is a side view of the flare cutter of the camera body according to the embodiment.

FIG. 8A is a rear view of flare cutter 500 of camera body 110 according to the present embodiment. FIG. 8B is a side view of flare cutter 500 of camera body 110 according to the present embodiment.

Flare cutter 500 includes through-holes 501 and 502 for respectively allowing screws 801 and 802 to pass through. Control board 700 includes through-holes 701 and 702 for respectively allowing screws 801 and 802 to pass through (see FIGS. 3 and 10B). The positions of through-holes 501 and 502 respectively correspond to the positions of through-holes 701 and 702 of control board 700.

Screw 801 is screwed into a screw hole (not illustrated) of the rear face of front case 400 through through-hole 701 and through-hole 501 (see FIG. 3). Screw 802 is screwed into screw hole 302 of the rear face of front case 400 through through-hole 702 and through-hole 502 (see FIGS. 3 and 6).

In such a manner, control board 700 is attached to flare cutter 500 by components such as screws 801 and 802. Flare cutter 500 and control board 700 are attached to front case 400 by components such as screws 801 and 802. Screw 803 is screwed into screw hole 403 of front case 400 through through-hole 503 of flare cutter 500 (see FIG. 6). Such a structure leads to reduction in the number of components of the camera body.

As FIG. 8A and FIG. 8B illustrate, flare cutter 500 is provided with U-shaped shutter holders 510 and 520. Shutter holders 510 and 520 are bent at approximately 90 degrees from both sides of flare cutter 500 sandwiching opening 530 toward the rear.

Flare cutter 500 includes open holes 511 and 521 at the bottom portion. Shutter holders 510 and 520 and open holes 511 and 521 are used for attachment of flare cutter 500 and shutter unit 600.

Reference pin 561 protrudes from the bottom left corner of the rear face of flare cutter 500. Reference pin 562 protrudes from the bottom right corner of the rear face of flare cutter 500. Reference pins 561 and 562 contact the front face of shutter unit 600.

[1-3-2. Structure of Shutter Unit]

Figure 9A:
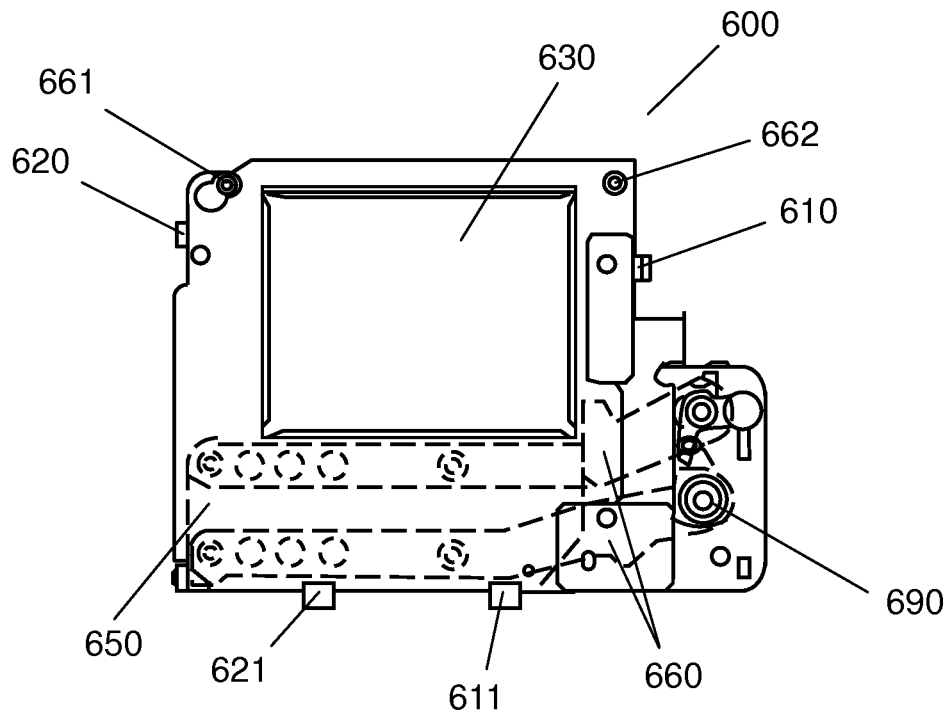
FIG. 9A is a front view of a shutter unit of the camera body according to the embodiment.
Figure 9B:
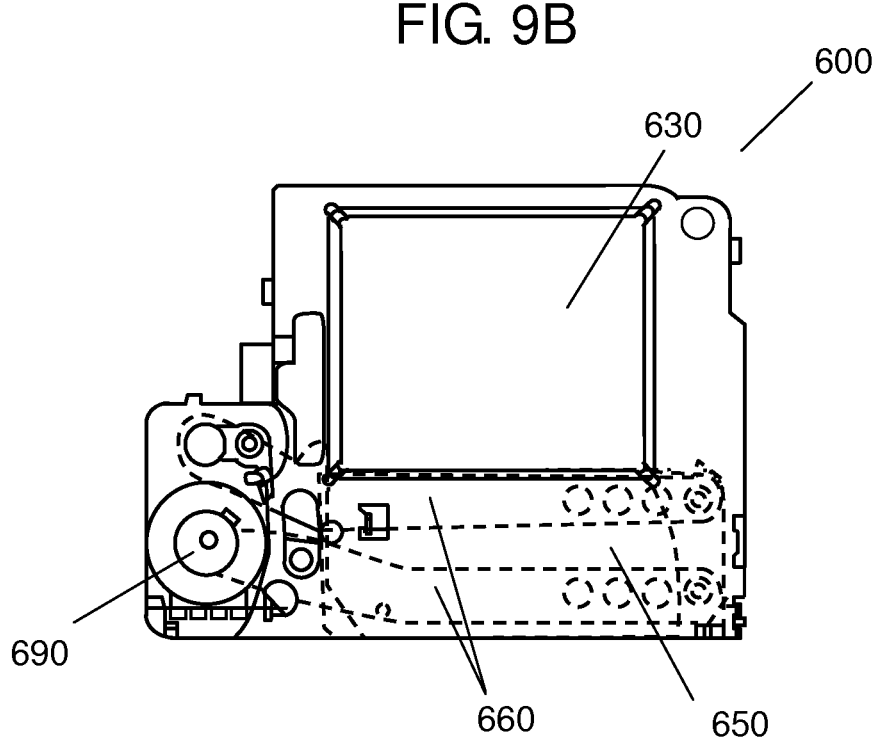
FIG. 9B is a rear view of the shutter unit of the camera body according to the embodiment.

Referring to FIGS. 9A and 9B, a description will be given of a structure of shutter unit 600. Shutter unit 600 includes shutter curtain 650, arms 660, and motor 690. In the present embodiment, single shutter curtain 650 is independently movable between a position at which opening 630 of shutter unit 600 is covered and a position at which opening 630 is not covered. Specifically, shutter unit 600 is a single-curtain mechanical shutter. Hence, an area for the shutter curtain 650 to rest is not necessary at a portion above opening 630 of shutter unit 600.

FIG. 9A illustrates shutter curtain 650 and arms 660 in dashed lines. In the state illustrated in FIG. 9A, shutter curtain 650 and arms 660 are located at positions that are not viewed from opening 530 of flare cutter 500.

Shutter unit 600 further includes opening 630. Opening 630 of shutter unit 600 may have any size as long as an optically required effective area can be ensured. Specifically, opening 630 (third opening) of shutter unit 600 has any size as long as opening 630 is smaller than opening 530 (first opening) of flare cutter 500. Moreover, it is preferable that opening 630 of shutter unit 600 be as small as possible to achieve downsizing.

Protrusions 610 and 620 protrude from the side faces of shutter unit 600. Protrusions 611 and 621 protrude from the bottom of shutter unit 600. Protrusion 610 is engaged with shutter holder 510, and protrusion 620 is engaged with shutter holder 520. Protrusion 611 is inserted into open hole 511, and protrusion 621 is inserted into open hole 521. As a result, shutter unit 600 is attached to flare cutter 500 (see FIG. 8A and FIG. 9A).

Here, shutter unit 600 and flare cutter 500 are not fixed to each other by components such as screws. This is to prevent vibration caused by movement of shutter curtain 650 from propagating to another component (for example, the imaging device unit or the interchangeable lens) as much as possible. Such a structure reduces propagation of vibration of shutter unit 600 to the imaging device, leading to reduction in image blurring.

Reference pin 661 protrudes from the top left corner of the front face of shutter unit 600. Reference pin 662 protrudes from the top right corner of the front face of shutter unit 600. Reference pins 661 and 662 contact the rear face of flare cutter 500 (see FIG. 12).

[1-4. Positional Relationship of Major Parts of Camera Bodyt]

Figure 10A:
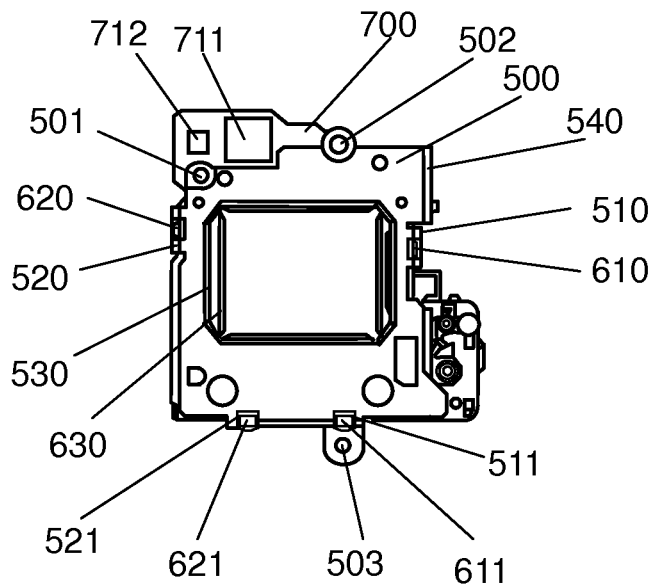
FIG. 10A is a front view of the flare cutter, the shutter unit, and the control board which are assembled, according to the embodiment.
Figure 10B:
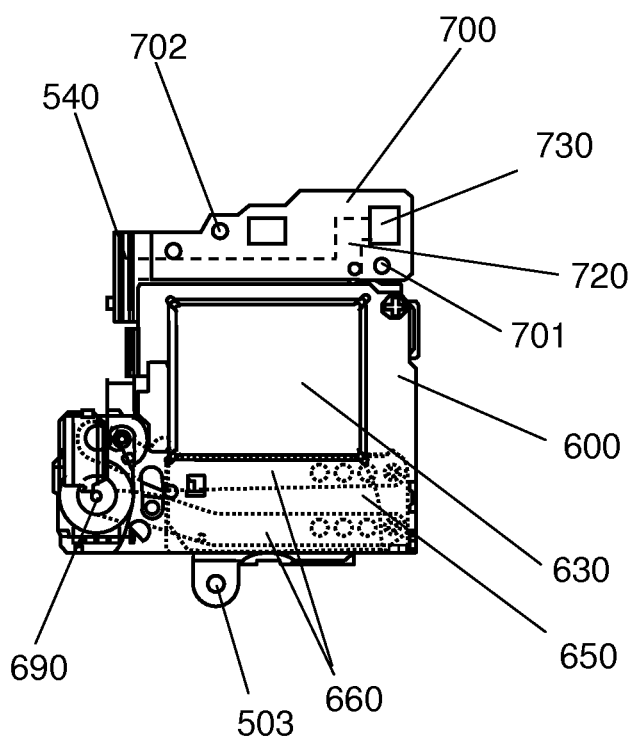
FIG. 10B is a rear view of the flare cutter, the shutter unit, and the control board which are assembled, according to the embodiment.

Referring to FIG. 10A and FIG. 10B, a description will be given of a relationship between flare cutter 500, shutter unit 600, and control board 700.

As FIG. 10A illustrates, electronic components such as coil 711 and IC 712 are mounted on the front face of control board 700. Coil 711 and IC 712 are control components used to remove dust and the like attached on the imaging device of the imaging device unit. In order to efficiently use a space above shutter unit 600, control board 700 is disposed at a position which does not overlap with shutter unit 600 on a plane vertical to an optical axis. The electronic components such as coil 711 and IC 712 are disposed at positions which do not overlap with flare cutter 500.

As FIG. 10B illustrates, when flare cutter 500 is viewed from a face of shutter unit 600 opposite a face of shutter unit 600 facing flare cutter 500, control board 700 is disposed at a position which does not overlap with shutter unit 600 on a plane vertical to the optical axis.

When flare cutter 500 is viewed from a face of shutter unit 600 opposite to a face of shutter unit 600 facing flare cutter 500, control board 700 is disposed at a position facing shutter curtain 650 across opening 630 of shutter unit 600.

Such a structure leads to small camera body 110 which prevents leakage of light.

A portion of the front face of control board 700 contacts a portion of the rear face of flare cutter 500. Specifically, control board 700 is located at the top of flare cutter 500. The bottom portion of the front face of control board 700 contacts the top portion of the rear face of flare cutter 500. In other words, control board 700 is disposed on the face of flare cutter 500 facing shutter unit 600. Such a structure leads to small camera body 110 which prevents leakage of light.

Flare cutter 500 is provided with flexible printed board holder 540 which is bent approximately at 90 degrees from the plane, in which opening 530 is formed, toward the rear. Flexible printed board holder 540 includes open hole 570 (see FIG. 8B). Flexible printed board 720 is connected to connector 730 on the rear face of control board 700 through open hole 570.

In the state where flexible printed board 720 passes through open hole 570 of flexible printed board holder 540, the imaging device unit is attached. As described above, flexible printed board holder 540 allows flexible printed board 720 to be positioned when the imaging device unit is attached, which facilitates assembly of camera body 110.

Figure 5:
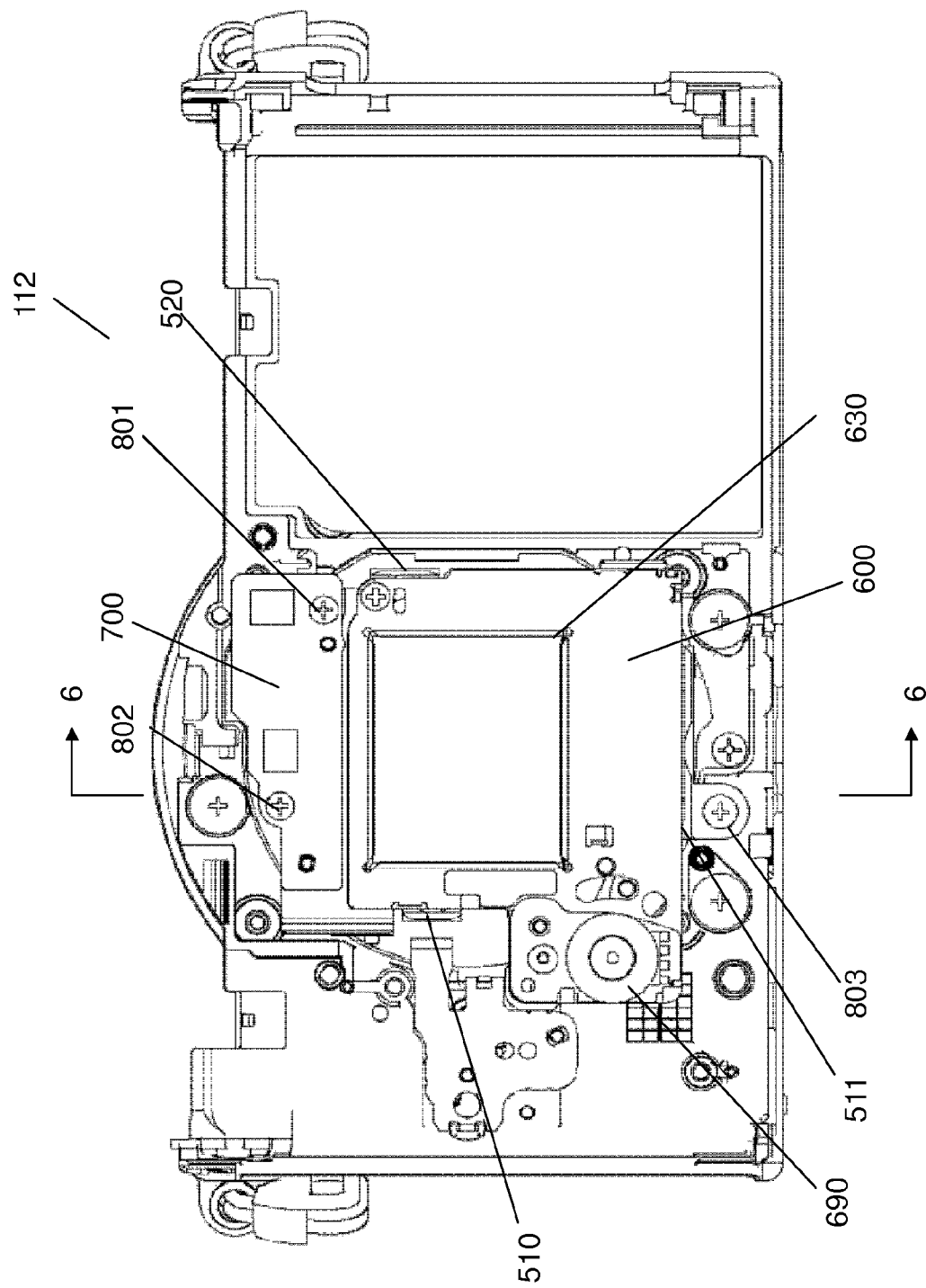
FIG. 5 is a rear view of the front unit of the camera body according to the embodiment.
Figure 6:
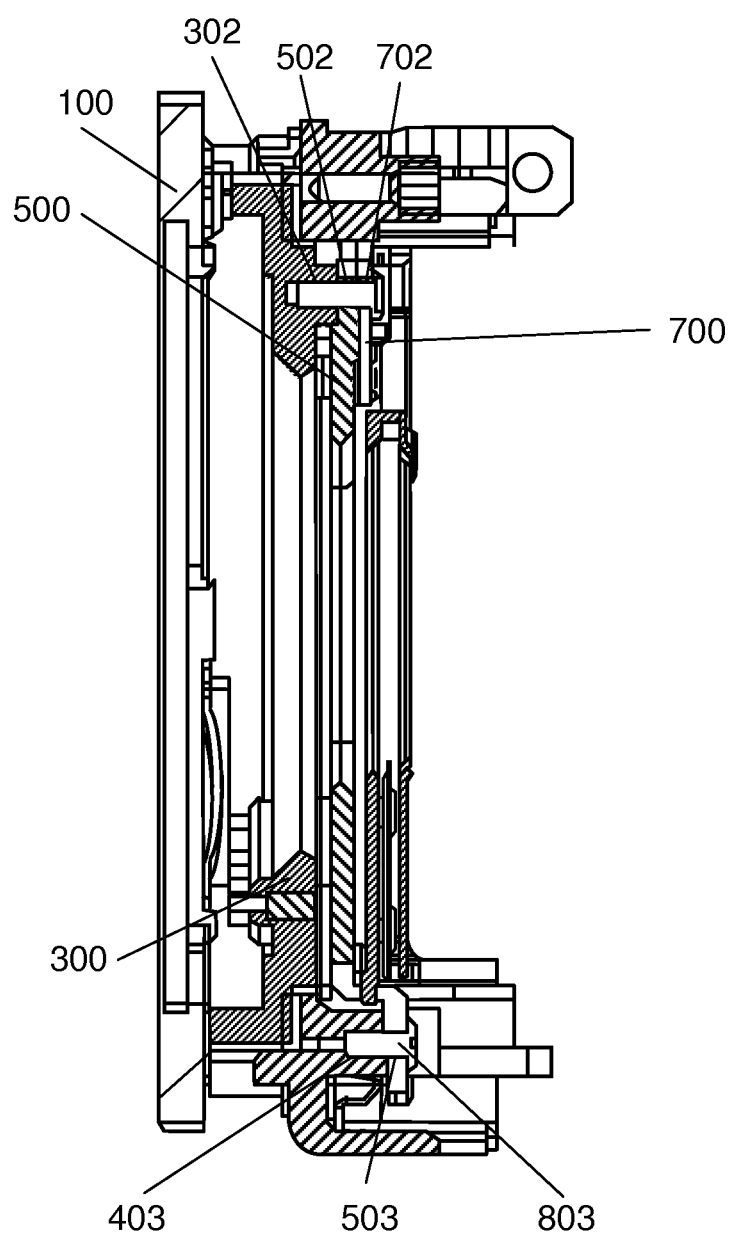
FIG. 6 is a cross-sectional view taken along line 6-6 in FIG. 5.
Figure 11:
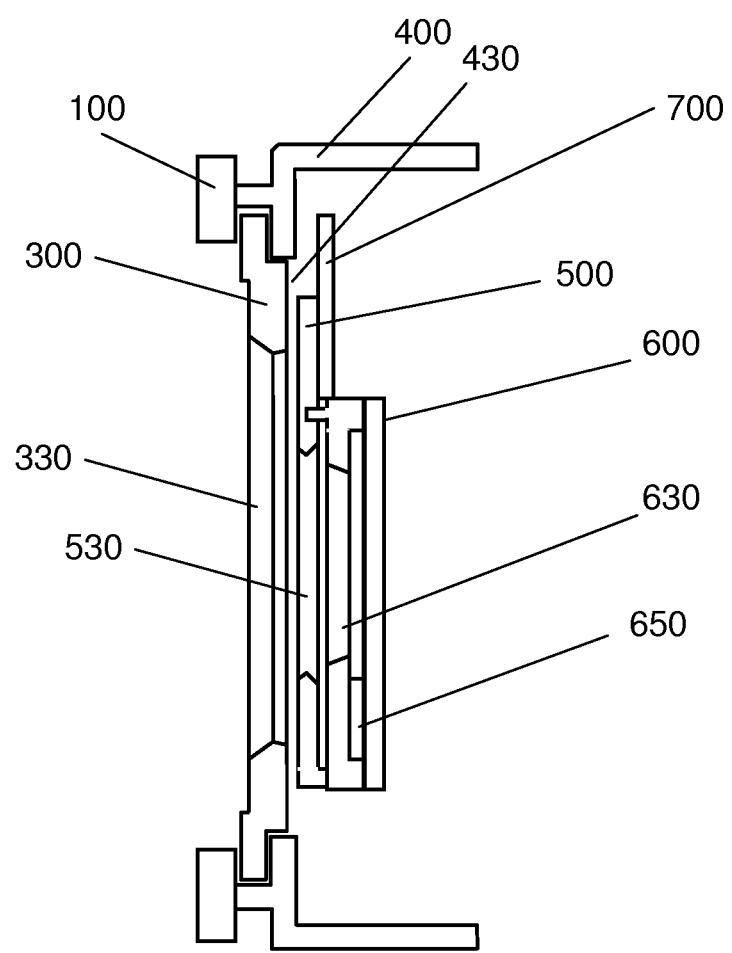
FIG. 11 is a schematic cross-sectional view illustrating a relationship between the flare cutter, the shutter unit, and the control board according to the embodiment.

Referring to FIGS. 6 and 11, a description will be given of a relationship between front case 400, flare cutter 500, shutter unit 600, and control board 700 according to the present embodiment. FIG. 6 is a cross-sectional view of line 6-6 in FIG. 5, and FIG. 11 is a schematic view of major parts in the cross-sectional view. FIG. 11 is a cross-sectional view with hatching omitted.

Flare cutter 500, shutter unit 600, and control board 700 are disposed on the rear face of front case 400. When control board 700 is viewed from the front side, a part of control board 700 positioned inside opening 430 of front case 400 and outside opening 530 of flare cutter 500. Such a structure leads to small camera body 110 which prevents leakage of light. Mount base 300 and flare cutter 500 define an effective diameter of camera body 110.

Figure 12:
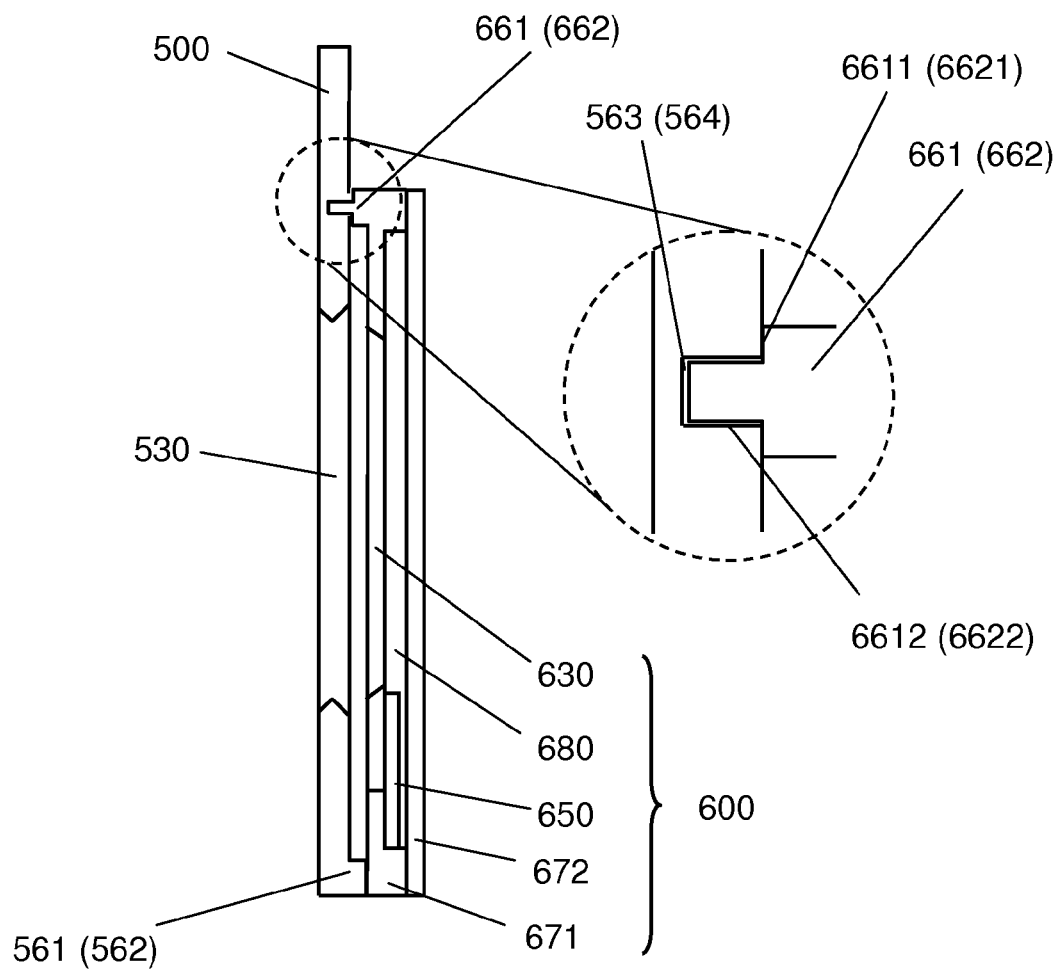
FIG. 12 is a schematic cross-sectional view illustrating a relationship between the flare cutter and the shutter unit according to the embodiment.

Referring to FIG. 12, a description will be given of a relationship between flare cutter 500 and shutter unit 600 according to the present embodiment. FIG. 12 is a cross-sectional view with hatching omitted.

Flare cutter 500 is provided with reference pins 561 and 562 (see FIGS. 8A and 12). Shutter unit 600 is provided with reference pins 661 and 662 (see FIGS. 9A and 12). Flare cutter 500 and shutter unit 600 are positioned by reference pins 561 and 562 and reference pins 661 and 662, and are in contact with each other.

As FIG. 12 illustrates, shutter unit 600 has a box shape. Specifically, shutter unit 600 includes a recessed holding component 671 and a plate-shaped holding component 672 so that space 680 where shutter curtain 650 moves is ensured. If flare cutter 500 contacts a position corresponding to space 680 where shutter curtain 650 moves, the shape of shutter unit 600 may change. Hence, in the present embodiment, flare cutter 500 contacts shutter unit 600 at a position other than the position of space 680 where shutter curtain 650 moves. Such a structure reduces change in shape of shutter unit 600.

Next, a description will be given of effects of reference pins 661 and 662. Flare cutter 500 includes holes 563 and 564 at positions respectively corresponding to reference pins 661 and 662 (see FIGS. 8A and 12). Reference pins 661 and 662 are respectively inserted into holes 563 and 564 so that shutter unit 600 is engaged with flare cutter 500.

If holes are provided in shutter unit 600, areas for the holes are necessary. Moreover, surrounding areas of the holes need certain strength, which results in an increase in size of shutter unit 600 or a need for components surrounding the holes. As a result, the size of shutter unit 600 increases, which increases the size of camera body 110 as a whole.

Reference pins 661 and 662 also serve to restrict rotation of shutter unit 600. As FIG. 12 illustrates, reference pins 661 and 662 have a stepped two pin structure. The first pins (wider lower step portions) of reference pins 661 and 662 have top faces (6611, 6621) which contact flare cutter 500 and restrict the distance between shutter unit 600 and flare cutter 500. The second pins (smaller upper step portions) of reference pints 661 and 662 have side faces (6612, 6622) which contact flare cutter 500 and restrict rotation of shutter unit 600.

In the present embodiment, electronic components such as coil 711 and IC 712 are disposed on control board 700. However, the present disclosure is not limited to such an example, and other electronic components such as a control circuit for a flash may be disposed on control board 700.

Figure 13:
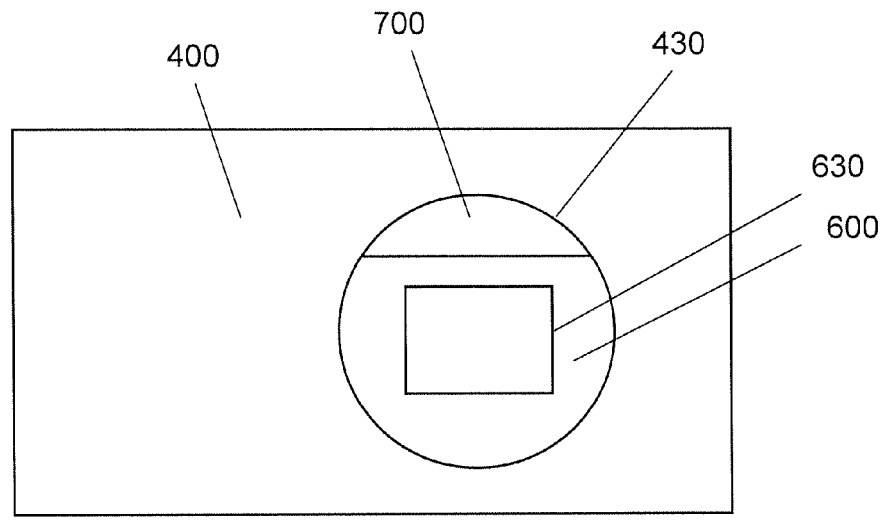
FIG. 13 is a schematic view of layout of the front case, the shutter unit, and the control board according to the embodiment.
Figure 14:
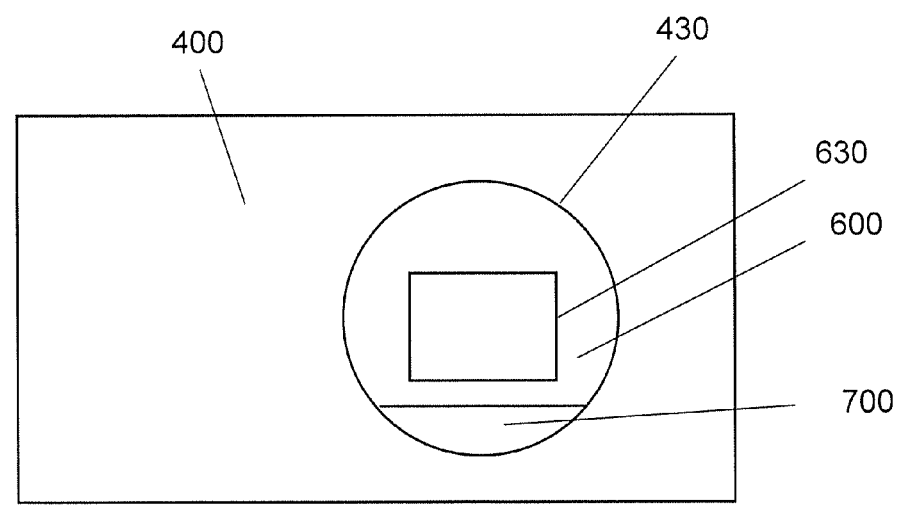
FIG. 14 is a schematic view of another layout of the front case, the shutter unit, and the control board according to the embodiment.

Referring to FIG. 13 and FIG. 14, a description will be given of the layout according to the present embodiment. In the present embodiment, as FIG. 13 illustrates, control board 700 is located at the top of shutter unit 600. However, as FIG. 14 illustrates, control board 700 may be located at the bottom of shutter unit 600.

[2. Effects]

As described above, in the present embodiment, camera body 110 includes flare cutter 500, front case 400, a shutter unit 600, and control board 700. Front case 400 is disposed facing the first face of flare cutter 500. Control board 700 is connected to the second face of flare cutter 500 that is opposite the first face of flare cutter 500. When camera body 110 is viewed from an object side, control board 700 does not overlap with shutter unit 600.

When the control board 700 is viewed from the front side, a part of control board 700 positioned inside opening 430 of front case 400 and outside opening 530 of flare cutter 500. Such a structure leads to small camera body 110 which prevents leakage of light.

The present embodiment has been described as an example of the technique disclosed by the present application. However, the technique according to the present disclosure is not limited to the above example, and is also applicable to the present embodiment on which various modifications, replacements, additions, omissions, and the like are performed.

According to the present disclosure, the flare cutter and the shutter unit can be preferably disposed, which allows downsizing of the camera body as a whole.

The present disclosure is applicable to a camera body including a shutter unit. More specifically, the present disclosure is applicable to a mirrorless camera, a movie camera, a single-lens reflex camera, and the like.

What is claimed is:

1. A camera body comprising:
   a flare cutter including a first opening;
   a front case disposed facing a first face of the flare cutter and including a second opening at a position facing the first opening;
   a shutter unit disposed facing a second face of the flare cutter and including a third opening smaller than the first opening;
   a control board disposed on the second face of the flare cutter, the second face being opposite the first face; and
   an electronic component mounted on the control board, wherein:
   the electronic component is not directly related to the shutter unit,
   the control board is directly fixed to the flare cutter, and
   when the camera body is viewed from an object side, the control board does not overlap with the shutter unit.

2. The camera body according to claim 1, wherein the second opening is larger than the first opening, and when the flare cutter is viewed from the object side, a part of the control board is positioned inside the second opening and outside the first opening.

3. The camera body according to claim 1, wherein:
   the electronic component is mounted on the control board at a side facing the front case.

4. The camera body according to claim 1,
   wherein the shutter unit includes:
   a shutter curtain movable between a position at which the third opening is covered and a position at which the third opening is not covered; and
   a space where the shutter curtain moves, and the shutter unit is in contact with the flare cutter at a position other than the space where the shutter curtain moves.

5. The camera body according to claim 4,
   wherein the shutter unit includes a reference pin at a position other than the space where the shutter curtain moves,
   the flare cutter includes a hole, and
   the shutter unit is engaged with the flare cutter by the reference pin being inserted into the hole.

6. The camera body according to claim 4,
   wherein in a case where a face of the shutter unit facing the flare cutter is defined as a first face of the shutter unit, and a face of the shutter unit opposite to the first face of the shutter unit is defined as a second face of the shutter unit, and
   in a state where the third opening is not covered with the shutter curtain,
   when the flare cutter is viewed from the second face of the shutter unit, the control board is disposed at a position facing the shutter curtain across the third opening.

7. The camera body according to claim 1,
   wherein when the camera body is viewed from the object side, a part of the control board overlaps with the flare cutter.

8. The camera body according to claim 1, further comprising:
   a holding component which attaches the flare cutter and the control board to the front case.

9. The camera body according to claim 1, further comprising a lens mount attached to the front case.

10. The camera body according to claim 1, wherein the shutter unit includes a single-curtain mechanical shutter.

* * * * *